3,167,419
PROCESS FOR THE STAGEWISE FLUIDIZED BED ROASTING OF SULFIDIC IRON MINERALS
Georg Wittmann, Joseph Hille, and Herbert Wolf, all of Ludwigshafen (Rhine), Germany, assignors to Badische Anilin- & Soda-Fabrik Aktiengesellschaft, Ludwigshafen (Rhine), Germany
No Drawing. Filed Oct. 19, 1961, Ser. No. 146,331
Claims priority, application Germany, Oct. 22, 1960, B 59,824
2 Claims. (Cl. 75—9)

This invention relates to a process for the stagewise roasting of sulfidic iron minerals in fluidized beds for the purpose of recovering a coarse-grained roasted ore which can be sintered and leached without adding coarser-grained roasted ores.

Single-stage fluidized bed processes for roasting sulfidic iron minerals are especially suitable for very fine-grained ores, such as flotation concentrates, or also for genuine sulfidic iron ores provided their grain size does not exceed 6 mm. When roasting coarse-grained pyrites rich in sulfur, known in professional terminology as "fine pyrites" to distinguish it from "flotation pyrites" with a maximum grain size of about 0.10 mm., an amount of dust of up to about 90% is obtained as a result of the high gas velocity necessary for fluidization and the tendency of the ore particles to decrepitate; in individual cases even the whole of the roasted ore may be discharged as dust. When roasting flotation pyrites, the proportion of dust of the total roasted ore is only about 50%, i.e., much lower. It is true that in the case of flotation pyrites smaller gas velocities are used, and therefore lower throughputs, but the fluidized bed heights are greater. Many fine pyrites in fact give a much finer precipitator dust than flotation pyrites.

For the further working up of roasted ores which have been obtained by roasting sulfidic iron ores, such as pyrites or pyrrhotite, it is of special economic importance, apart from other factors, that the roasted ore obtained by the roasting process should be as coarse-grained as possible with only a small proportion of dust. In the case of roasted ores which do not contain non-ferrous metals which interfere with smelting, i.e., roasted ores which are supplied direct to the blast furnace, the sintering operation that precedes the blast furnace process is facilitated by coarse granules and its cost is reduced.

In the case of roasted ores with a content of non-ferrous metals, such as copper and zinc, a chloridizing and/or sulfating roasting preceding the smelting of the iron in the blast furnace is indispensable, and any semi-precious or precious metals that may be contained in the roasted ores, such as silver and gold, may render an additional operation necessary. Removal of the non-ferrous metals and also of the semiprecious and precious metals is effected almost exclusively by leaching after appropriate pretreatment.

In order that the process used for the said purposes may be practicable and economical to carry out, the grain size distribution of the roasted ore, among other things, is of decisive importance. Roasted ore which is too finely grained leads to difficulties already in the chloridizing or sulfating roasting owing to the formation of deposits in the roasting furnace so that leaching of the non-ferrous metals is not ensured, and also leads to a marked decrease in throughput. Special difficulties arise in the leaching processes because roasted ores which are too fine may prolong the leaching periods, making the process uneconomical. Moreover fine roasted ores have a general tendency to pocket formation, i.e., part of the fine roasted ore does not come into contact at all with the liquor during leaching. The result is that, for example, copper and zinc are not removed from these pockets and therefore the content of copper and zinc in the leached roasted ore exceeds the permissible limits. For these reasons there is a technical requiremnt to produce roasted ores by the fluidized bed roasting method whose grain size distribution is similar to that of ores obtained by roasting in multiple-hearth furnaces or rotary kilns, i.e., roasted ores in which the fraction of grain sizes below 0.25 mm. is 25% and at the most 30% and which after chloridizing or sulfating roasting have a total leaching time like coarse-grained roasted ores from multiple-hearth furnaces or rotary kilns. Furthermore, considerable technical advantages result for the fluidized bed roasting itself if it is possible to decrease the powder fraction of the roasted ore to about 25%, because then the degree of purification of the roaster gases is comparable with that of multiple-hearth furnaces or rotary kilns.

Even disregarding the above-mentioned disadvantages, it has hitherto only been possible in the single-stage fluidized bed roasting to process sulfidic iron materials whose grain size does not exceed 6 mm.

In this process, even when introducing materials with a maximum grain size of 6 mm., a roasted ore is obtained of which at least 40% consists of particles of less than 0.25 mm., so that by reason of the long leaching periods, which may be up to 10 to 15 times the length of the leaching periods of roasted ores from multiple-hearth furnaces and rotary kilns, such roasted ores could hitherto only be processed in admixture with other coarse-grained roasted ores. Also the said fine roasted ore can only be introduced to a limited extent in sintering because otherwise the sinter band is loaded with very large amounts of returned material.

We have now found that in the stagewise fluidized bed roasting of sulfidic iron minerals, such as pyrites or pyrrhotites, with separate and independent supply of oxygen-containing fresh gas to the individual fluidized beds and separate and independent withdrawal of the roaster gases formed from the individual fluidized beds, roasted ores are obtained which can be processed on the sintering belt by themselves or can be leached by themselves by using sulfidic broken iron minerals with a maximum grain size of 10 mm., preferably 8 mm., and maintaining the height of the individual fluidized beds at 20 to 35 cm., preferably 25 to 30 cm., and the amount of oxygen-containing gases introduced hourly into the pre-roasting stage between 5,700 and 20,000 m.$^3$ (S.T.P.) per m.$^2$ roasting surface and that into the further roasting stage or stages between 2,000 and 2,700 m.$^3$ (S.T.P.) per m.$^2$ roasting surface. A critical importance attaches to the maintenance of a fluidized bed height of 20 to 35 cm. when processing minerals with a maximum grain size of 8 or 10 mm., especially in the fluidized bed or beds used for the after-roasting; in the pre-roasting stage, maintenance of this range is especially important for materials with a grain size up to 8 mm. This result is the more surprising since in the pertinent literature, apart from decrepitation, it has hitherto been the high air admission with fine pyrites roasting as compared with the lower air admission with flotation pyrites roasting which has been adduced as the cause of the extreme fineness of the roasted ore from so-called fine pyrites.

We have found that for fine pyrites with a maximum grain size of 8 or 10 mm. it is necessary to increase the amount of air introduced into the fluidized bed used for preliminary roasting far beyond the amount hitherto usual. For the preliminary roasting of sulfidic iron minerals with a maximum grain size of 8 mm., the minimum amount of air to be introduced is 5,700 m.$^3$ (S.T.P.) per m.$^2$ roasting surface per hour, and for minerals with a maximum grain size of 10 mm. it is as much as 6,500 m.$^3$ (S.T.P.) per m.$^2$ roasting surface per hour, if satisfactory fluidization is to be ensured. When introducing sulfidic iron minerals with a grain size range of 8 to 10 mm., the amount of oxygen-containing gases to be introduced into the pre-roasting stage may be increased to 20,000 m.$^3$ (S.T.P.) per m.$^2$ roasting surface per hour. It is similarly surprising that in the fluidized beds serving for the after-roasting, 2,000 to 2,700 m.$^3$ (S.T.P.) per m.$^2$ of oxygen-containing gas is entirely sufficient for the said grain sizes and that the technically possible increase of the amount of air beyond this will even exert an injurious influence in respect of obtaining a coarse-grained roasted ore.

Working with fluidized bed heights of 35 cm. and less has hitherto been avoided because they were considered not to be safe in operation with roasting surfaces of several square meters and always required great attention from the team of operators. Operation of such low fluidized beds can be considerably simplified by using an automatic furnace control according to a proposal which is made in our copending application Serial No. 35,710, filed June 13, 1960, by Georg Wittmann, Konrad Hengst and Hans Stumpfi.

In the preliminary roasting stage, the material being treated can be roasted to a sulfur content of less than 3%. The upper limit of the sulfur content in the preliminarily roasted material is given by the atomic ratio of Fe:S equal to 1:1.20, and is thus dependent on the iron content of the initial material.

To remove the dust from the roaster gases from the first fluidized bed serving for the preliminary roasting, a hot cyclone is usually employed. The gases leaving this hot cyclone, when introducing coarse-grained pyrites, carry out about 3 to 5% of the preliminarily roasted material from the cyclone. This proportion may be subsequently burnt with addition of air according to a known proposal before the gases are subjected to a further purification.

By the conventional method of roasting fine pyrites in fluidized beds of about 60 to 80 cm. in height, even when coarse-grained material is introduced, only roasted material is obtained whose fraction of grain sizes below 0.25 mm. is far greater than 30%.

Flotation pyrites may be roasted according to the process of the invention resulting in the recovery of roasted ores which can be sintered or leached by themselves, i.e., without addition of coarse-grained roasted ore, by first agglomerating the flotation pyrites to pellets with a diameter up to about 10 mm.

According to measurements taken in commercial scale plants, a total residence period of the minerals to be treated in the fluidized beds of for example about half an hour is sufficient to achieve a fully satisfactory roasting.

The introduction of air into the preliminary roasting stage of between 5,700 and 20,000 m.$^3$ (S.T.P.) per m.$^2$ roasting surface and per hour, presupposes a conical, downwardly constricted fluidized bed furnace for the pre-roasting stage, in order to ensure the necessary residence period of the solids in this fluidized bed. A conical fluidized bed furnace may also be used in the after-roasting stage.

By further shortening of the residence period it is possible in the case of pyrites containing copper and zinc to set up a residual sulfur content of about 3% in the final roasted ore, such as may be desirable for the chloridizing roasting of the roasted ore.

This is possible even when an oxygen excess of 30 to 50% beyond the theoretical requirement is used in the after-roasting stage, such as is usual in two-stage fluidized bed roasting.

The efficiency of the process according to this invention is illustrated by the following examples, but the invention is not limited thereto.

*Example 1*

Pyrites with 47.6% of S, 42.0% of Fe, 2.96% of Cu, 0.53% of Zn, 0.02% of As and 0.03% of Pb and having the following grain size distribution in percent by weight:

| 10 to 8 mm. | 8 to 6 mm. | 6 to 4 mm. | 4 to 2 mm. | 2 to 0 mm. |
|---|---|---|---|---|
| 20.8 | 37.7 | 24.2 | 10.5 | 6.8 | is pre-roasted in the first stage in a fluidized bed of 32 cm. height and 14,800 m.$^3$ (S.T.P.) per m.$^2$ roasting surface per hour of air is introduced at a temperature of 780° C.; the pre-roasted material is completely roasted in the second stage while maintaining a fluidized bed height of 28 cm. and introducing into the fluidized bed 2,450 m.$^3$ (S.T.P.) per m.$^2$ of air per square meter of roasting surface per hour, a temperature of 740° C. being maintained in the fluidized bed.

The final roasted ore with 1.4% of total S, 59.2% of Fe, 4.16% of Cu, 0.74% of Zn, 0.03% of As and 0.04% of Pb has the following grain distribution in percent by weight:

| +5 mm. | 5 to 2 mm. | 2 to 0.25 mm. | Below 0.25 mm. |
|---|---|---|---|
| 7.6 | 28.4 | 39.7 | 24.3 |

This roasted ore is subjected by itself to a chloridizing or sulfating roasting; for leaching out and washing out the copper and zinc, 30 hours is required under the usual technical leaching conditions. The leached roasted ore can be economically agglomerated alone on a sintering belt before it is supplied to the blast furnace.

*Example 2*

Pyrites of Spanish origin with a maximum grain size of 8 mm. and with a content of 47.7% of S, 41.2% of Fe, 1.65% of Cu, 1.14% of Zn, 0.55% of Pb and 0.41% of As has the following grain size distribution in percent by weight:

| 8 to 6 mm. | 6 to 4 mm. | 4 to 2 mm. | 20 to mm. |
|---|---|---|---|
| 20.3 | 31.5 | 28.3 | 19.9 |

This pyrites is pre-roasted in the first stage at a temperature of 850° C. while maintaining a fluidized bed height of 30 cm. and introducing air in and amount of 10,400 m.$^3$ (S.T.P.) per m.$^2$ roasting surface per hour; in the second stage for the completion of the roasting of the pre-roasted material, a fluidized bed height of 26 cm. is maintained with oxygen-containing gas in an amount corresponding to 2,400 m.$^3$ (S.T.P.) of air per square meter of roasting surface per hour. The temperature in the second roasting stage is 720° C.

The finished roasted ore with 3.1% of total S, 58.0% of Fe, 2.31% of Cu, 1.60% of Zn, 0.43% of Pb and 0.04% of As has the following grain size distribution in percent by weight:

| +5 mm. | 5 to 2 mm. | 2 to 0.25 mm. | Below 0.25 mm. |
|---|---|---|---|
| 3.2 | 28.1 | 43.8 | 24.9 |

A chloridizing or sulfating roasting is carried out with this roasted ore. For leaching out and washing out the copper and zinc, 34 hours is required under the usual conditions of leaching on a technical scale. The leached roasted ore is agglomerated by itself on a sintering belt before it is processed in the blast furnace.

*Example 3*

Spanish pyrites with 48.3% of S, 42.5% of Fe, 0.66% of Cu, 1.78% of zn, 0.65% of Pb, 0.52% of As and 0.05% of Sb and the following grain size distribution in percent by weight:

| 8 to 6 mm. | 6 to 4 mm. | 4 to 2 mm. | 2 to 0 mm. |
|---|---|---|---|
| 17.6 | 32.0 | 26.5 | 23.9 | is preroasted in the fluidized bed and the height of which is kept at 30 cm. and into which 8,600 m.$^3$ (S.T.P.) of air per square meter of roasting surface per hour is introduced, at a temperature of 850° C. To the second stage, at a fluidized bed height of 27 cm. oxygen-containing gas is introduced at a rate corresponding to 2,480 m.$^3$ (S.T.P.) per m.$^2$ roasting surface per hour, a temperature of 710° C. being maintained in the fluidized bed.

The final roasted ore with 2.6% of total S, 60.0% of Fe, 0.93% of Cu, 2.50% of Zn, 0.38% of Pb, 0.04% of As and 0.017% of Sb has the following grain size distribution in percent by weight:

| +5 mm. | 5 to 2 mm. | 2 to 0.25 mm. | Below 0.25 mm. |
|---|---|---|---|
| 4.8 | 26.7 | 44.0 | 24.5 |

After a chloridizing or sulfating roasting, the roasted ore requires 32 hours for leaching and washing under the usual leaching conditions.

It has been proposed to use a fluidized bed height of 1 to 5 feet for the fluidized bed roasting of arsenical pyrites and a total residence period of the solids in the reactor of 18 hours. It is impossible to deduce from this that coarse roasted ore would be obtained under the special conditions according to the present invention.

It has also been proposed to keep the introduction of air into the pre-roasting zone higher than, preferably twice as high as, that in the after-roasting zones. This measure by itself is however not sufficient to produce a roasted ore which can be sintered and leached by itself.

We claim:

1. In a process for the recovery of coarse-grained roasted ore by the stage-wise roasting of sulfidic iron minerals selected from the group consisting of pyrites and pyrrhotites, in fluidized beds with separate and independent supply of fresh gas containing free oxygen to the individual fluidized beds and separate and independent withdrawal of the roaster gases formed from said individual fluidized beds the improvement which comprises introducing the sulfidic iron mineral with a grain size up to 8 to 10 mm. whilst maintaining the height of each of the individual fluidized beds at 20 to 35 cm., and supplying free oxygen containing gas to the fluidized bed for the preroasting in an amount of 5,700 to 20,000 m.$^3$ (S.T.P.) per m.$^2$ roasting surface per hour and to the subsequent at least one fluidized bed for further roasting in an amount of 2,000 to 2,700 m.$^3$ (S.T.P.) per m.$^2$ roasting surface per hour.

2. In a process for the recovery of coarse-grained roasted ore by the stage-wise roasting of sulfidic iron minerals selected from the group consisting of pyrites and pyrrhotites, in fluidized beds with separate and independent supply of fresh gas containing free oxygen to the individual fluidized beds and separate and independent withdrawal of the roaster gases formed from said individual fluidized beds the improvement which comprises introducing the sulfidic iron mineral with a grain size up to 8 to 10 mm. whilst maintaining the height of each of the individual fluidized beds at 25 to 30 cm., and supplying free oxygen containing gas to the fluidized bed for the pre-roasting in an amount of 5,700 to 20,000 m.$^3$ (S.T.P.) per m.$^2$ roasting surface per hour and to the subsequent at least one fluidized bed for further roasting in an amount of 2,000 to 2,700 m.$^3$ (S.T.P.) per m.$^2$ roasting surface per hour.

References Cited in the file of this patent
UNITED STATES PATENTS

| 2,625,464 | Roberts et al. | Jan. 13, 1953 |
| 2,774,661 | White | Dec. 18, 1956 |
| 2,785,050 | Swaine et al. | Mar. 12, 1957 |
| 2,910,348 | Kuss et al. | Oct. 27, 1959 |

UNITED STATES PATENT OFFICE
CERTIFICATE OF CORRECTION

Patent No. 3,167,419                            January 26, 1965

Georg Wittmann et al.

It is hereby certified that error appears in the above numbered patent requiring correction and that the said Letters Patent should read as corrected below.

Column 4, in the third table, heading to the fourth column, for "20 to mm." read -- 2 to 0 mm. --.

Signed and sealed this 22nd day of June 1965.

(SEAL)
Attest:

ERNEST W. SWIDER                            EDWARD J. BRENNER
Attesting Officer                               Commissioner of Patents